US012649092B2

(12) United States Patent
Stanton

(10) Patent No.: US 12,649,092 B2
(45) Date of Patent: Jun. 9, 2026

(54) LACROSSE HEAD REMOVAL AND INSTALLATION TOOL

(71) Applicant: James Stephen Stanton, Jamesville, NY (US)

(72) Inventor: James Stephen Stanton, Jamesville, NY (US)

(*) Notice: Subject to any disclaimer, the term of this patent is extended or adjusted under 35 U.S.C. 154(b) by 0 days.

(21) Appl. No.: 18/897,908

(22) Filed: Sep. 26, 2024

(65) Prior Publication Data

US 2025/0099826 A1 Mar. 27, 2025

Related U.S. Application Data

(60) Provisional application No. 63/585,344, filed on Sep. 26, 2023.

(51) Int. Cl.

| | |
|---|---|
| ***A63B 59/20*** | (2015.01) |
| ***A63B 102/14*** | (2015.01) |
| ***B25B 27/02*** | (2006.01) |
| ***B25D 1/16*** | (2006.01) |

(52) U.S. Cl.

CPC .............. *A63B 59/20* (2015.10); *B25B 27/02* (2013.01); *B25D 1/16* (2013.01); *A63B 2102/14* (2015.10)

(58) Field of Classification Search

CPC ... A63B 2102/14; A63B 59/20; A61B 17/921; B25D 1/16; B25D 81/27; B25B 27/02

See application file for complete search history.

(56) References Cited

U.S. PATENT DOCUMENTS

| | | | | | |
|---|---|---|---|---|---|
| 593,942 | A * | 11/1897 | Johnson | B25D 1/16 | 81/27 |
| 669,086 | A * | 3/1901 | Heinrich | B25D 1/16 | 81/19 |
| 755,633 | A * | 3/1904 | Dieterle | B25D 1/00 | 7/138 |
| 3,253,329 | A * | 5/1966 | Lehn | B25B 27/02 | 81/22 |
| 6,561,932 | B2 * | 5/2003 | Morrow | A63B 49/025 | 473/513 |
| 6,949,037 | B2 | 9/2005 | Enos et al. | | |
| D537,940 | S * | 3/2007 | Buttler | D24/142 | |
| 7,214,151 | B1 * | 5/2007 | Gait | A63B 60/54 | D21/724 |
| 7,749,112 | B2 | 7/2010 | Hayden et al. | | |
| 7,874,945 | B2 | 1/2011 | Lucas et al. | | |
| 8,021,250 | B2 * | 9/2011 | Schmidt | A63B 59/20 | D21/724 |
| 8,046,899 | B2 | 11/2011 | Burch | | |
| 8,052,549 | B2 | 11/2011 | Sykora | | |
| 8,080,015 | B2 * | 12/2011 | Buttler | B25D 1/14 | 173/90 |
| 9,023,057 | B2 * | 5/2015 | Buttler | B25D 1/04 | 606/100 |
| 9,377,041 | B2 | 6/2016 | Sgroi, Jr. et al. | | |
| 9,579,551 | B2 | 2/2017 | Abdelmalek et al. | | |

(Continued)

*Primary Examiner* — William H Mcculloch, Jr.

(74) *Attorney, Agent, or Firm* — Dunlap Bennett & Ludwig PLLC; Anna L. Kinney

(57) ABSTRACT

A lacrosse head removal and installation tool includes a generally cuboid body and a handle joined to the body. The body has a first end and a second end, sidewalls, and a c-shaped channel formed longitudinally through the body. The handle in joined to one of the sidewalls of the body midway between the first end and the second end.

7 Claims, 4 Drawing Sheets

(56) References Cited

U.S. PATENT DOCUMENTS

| | | | | |
|---|---|---|---|---|
| 9,884,236 | B2 | 2/2018 | Gurney et al. | |
| 11,446,557 | B2 * | 9/2022 | Whitney | A63B 60/42 |
| 11,890,735 | B2 * | 2/2024 | Huang | B25D 1/16 |
| 2002/0128085 | A1 * | 9/2002 | Kallassy | A63B 69/3632<br>473/256 |
| 2002/0173388 | A1 * | 11/2002 | Morrow | A63B 59/30<br>473/513 |
| 2003/0184030 | A1 * | 10/2003 | Carbonneau | B25G 3/16<br>279/89 |
| 2004/0063522 | A1 | 4/2004 | Wolf | |
| 2004/0072638 | A1 * | 4/2004 | Enos | A63B 59/20<br>473/513 |
| 2005/0240197 | A1 * | 10/2005 | Kmiec, Jr. | A61B 17/921<br>606/100 |
| 2006/0011566 | A1 * | 1/2006 | Guy | A47F 7/0021<br>211/85.7 |
| 2008/0146386 | A1 | 6/2008 | Morrow | |
| 2009/0247331 | A1 * | 10/2009 | Schmidt | A63B 49/02<br>473/513 |
| 2012/0202622 | A1 | 8/2012 | Sena | |
| 2016/0001149 | A1 | 1/2016 | Jenkins et al. | |
| 2016/0166900 | A1 | 6/2016 | Colchie | |
| 2017/0036080 | A1 | 2/2017 | Thompson | |
| 2017/0225312 | A1 * | 8/2017 | Liao | B25D 1/16 |
| 2018/0001167 | A1 * | 1/2018 | Miceli | A63B 59/20 |
| 2018/0207498 | A1 | 7/2018 | Larson | |
| 2019/0168082 | A1 | 6/2019 | Ling | |
| 2019/0269985 | A1 | 9/2019 | Schmittdiel et al. | |
| 2020/0047040 | A1 * | 2/2020 | Hoeffner | A63B 24/0003 |
| 2022/0184789 | A1 * | 6/2022 | Huang | B25D 1/16 |
| 2025/0099826 | A1 * | 3/2025 | Stanton | A63B 59/20 |

* cited by examiner

LACROSSE HEAD REMOVAL AND INSTALLATION TOOL

CROSS-REFERENCE TO RELATED APPLICATION

This application claims the benefit of priority of U.S. provisional application No. 63/585,344, filed Sep. 26, 2023, the contents of which are herein incorporated by reference.

BACKGROUND OF THE INVENTION

The present invention relates to tools for ball game devices and, more particularly, to a lacrosse head removal and installation tool.

A lacrosse stick, or crosse, can be difficult to repair. If the head or the shaft breaks, the head must be separated from the shaft. One or both the head and shaft may require new holes to be drilled. A new head may need to be properly seated in the existing shaft or the existing head may need to be properly seated in a new shaft. However, there are no tools specifically designed to aid in making the repairs. The process can be difficult and time-consuming, and the quality of the repairs can suffer as a result.

As can be seen, there is a need for a device and method for easily removing and properly seating a lacrosse head.

SUMMARY OF THE INVENTION

In one aspect of the present invention, a lacrosse head removal and installation tool comprises a substantially cuboid body with sidewalls and a c-shaped channel formed longitudinally therethrough, the substantially cuboid body having a first end and a second end; and a handle adjoined thereto to one of the sidewalls midway between the first end and the second end.

These and other features, aspects and advantages of the present invention will become better understood with reference to the following drawings, description, and claims.

DETAILED DESCRIPTION OF THE INVENTION

Figure 1:
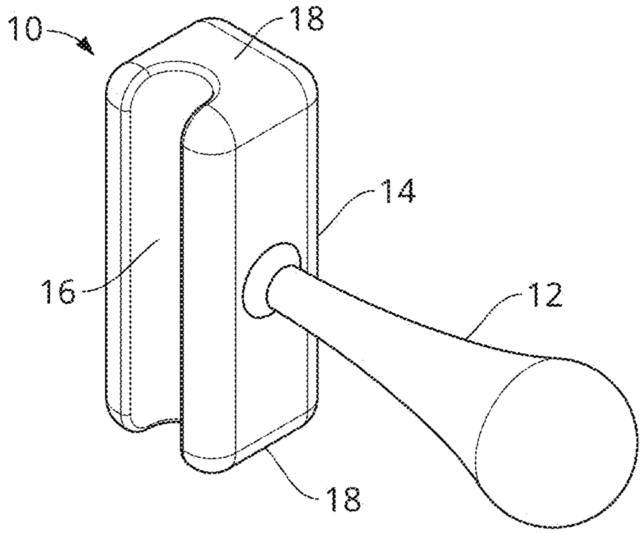
FIG. 1 is a top front perspective view of a Lacrosse head tool according to an embodiment of the present invention.
Figure 2:
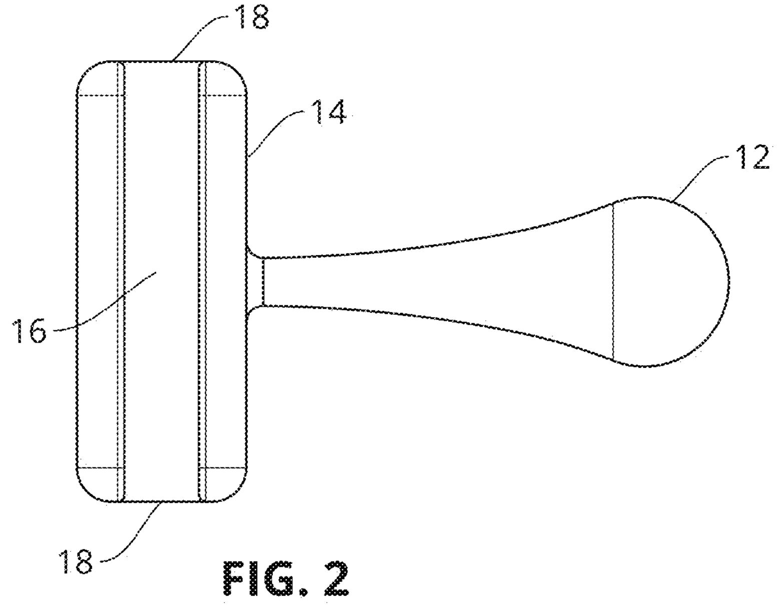
FIG. 2 is a front elevation view thereof.
Figure 3:
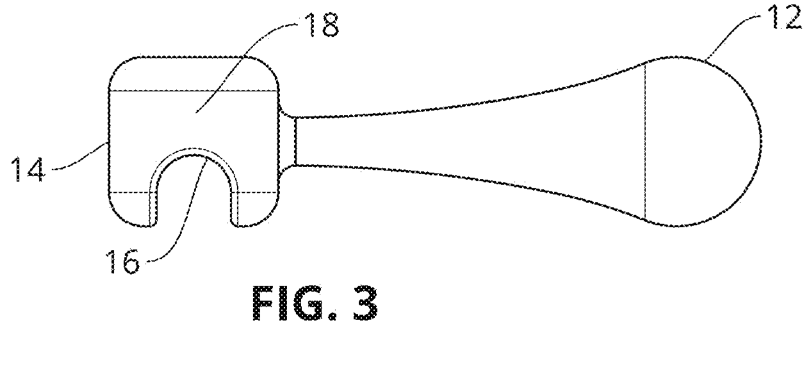
FIG. 3 is a top plan view thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a unitary lacrosse head removal and installation tool. The tool makes the process of removing a lacrosse head from a shaft, making repairs, and completely seating the lacrosse head to the shaft easier and more efficient.

The tool is a single unit with a handle and a body that may serve as a hammer.

To install a lacrosse head onto a shaft, a person may use an end of the body to tap the head, advancing the head onto the shaft until it is fully seated. The user may then drill holes in the shaft to secure the head in place. This eliminates incomplete attachment of the head.

The tool may also be used to remove a lacrosse head from a shaft for repairs which assists the user in recovering any non-broken part for re-use. To remove a lacrosse head from a shaft, a person may remove any screws securing the head to the shaft and guide the shaft through a channel in the tool body to a base of the lacrosse head. The user may remove the head from the shaft with, for example, a slapping motion, applying force to the base of the head to urge it off of the shaft.

Referring to FIGS. 1 through 7, FIGS. 1 through 5 illustrate a first embodiment of a lacrosse stick tool 10. The tool includes a bulbous handle 12 adjoined to a substantially cuboid body 14. The body 14 has a concave channel or c-shaped slot 16 formed longitudinally therethrough, and a flat face 18 on each longitudinal end. The channel 16 may be a longitudinal bore formed off-center through the body, interrupting one sidewall. The bottom face may be a mirror image of the top face.

Figure 4:
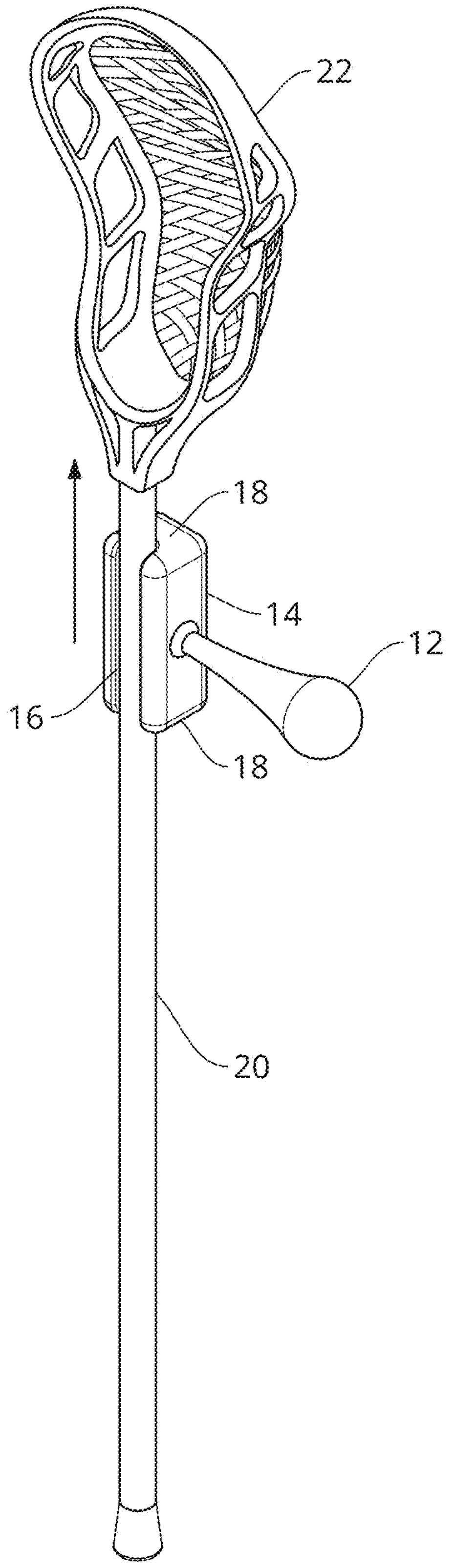
FIG. 4 is another top front perspective view thereof, shown in use.
Figure 5:
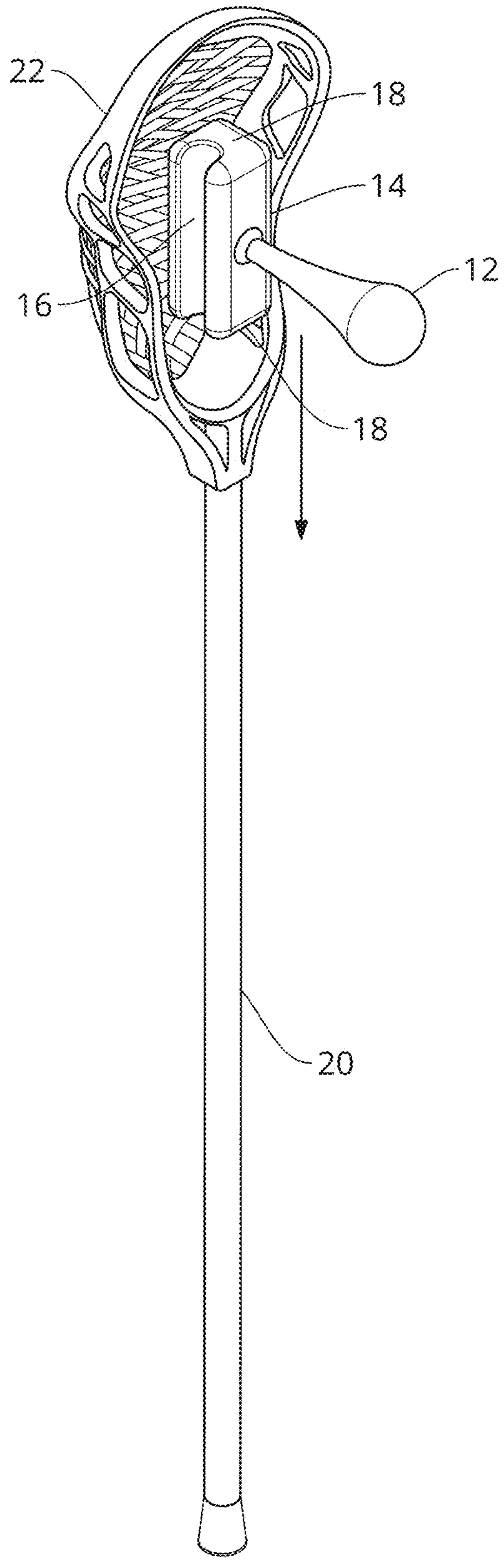
FIG. 5 is another top front perspective view thereof, shown in use.

FIGS. 4 and 5 illustrate use of the tool 10. A lacrosse shaft 20 is shown having an endcap at one end and a lacrosse head 22 at the other end. The lacrosse head 22 has a throat with sidewalls rising therefrom, surrounding a face to form a scoop. As shown in FIG. 4, the c-shaped slot 16 may be aligned on the shaft 20 and slid upward such that the top face 18 strikes against the throat of the lacrosse head 22 to remove the head 22. To install a lacrosse head 22 onto a shaft 20, the head 22 may be aligned with the end of the shaft 20 and the tool 10 may be driven down onto the throat of the head 22 in the manner of employing a mallet.

Figure 6:
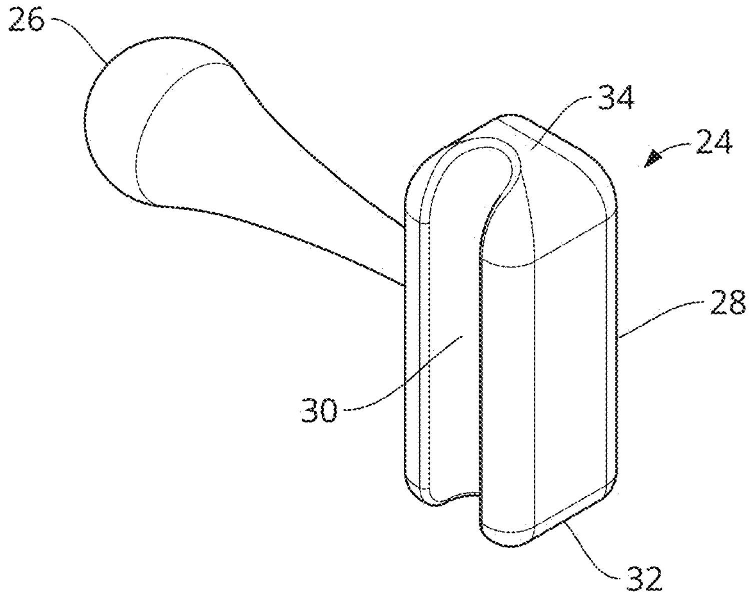
FIG. 6 is a top front perspective view of a Lacrosse head tool according to another embodiment of the present invention.
Figure 7:
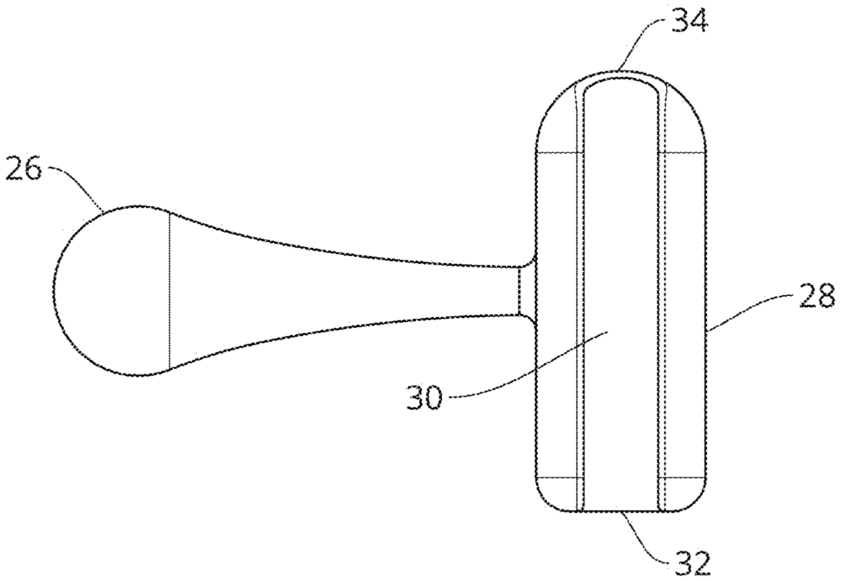
FIG. 7 is a front elevation view of the tool of FIG. 6.

In another embodiment illustrated in FIGS. 6-7, the tool 24 has a handle 26 adjoined with a body 28 having a longitudinal concave channel or c-shaped slot 30 formed therethrough, with a flat face 32 on a first end and a rounded face 34 on the opposite end, having a general contour of a lacrosse ball.

It should be understood, of course, that the foregoing relates to exemplary embodiments of the invention and that modifications may be made without departing from the spirit and scope of the invention as set forth in the following claims.

What is claimed is:

1. A lacrosse head removal and installation tool, comprising:

a unitary body including:

a substantially cuboid portion with sidewalls and a c-shaped channel formed longitudinally therethrough, the substantially cuboid portion having a first end and a second end having an arcuate surface with a radius of curvature corresponding to the radius of curvature of a lacrosse ball; and a handle adjoined to one of the sidewalls midway between the first end and the second end.

2. The lacrosse head removal and installation tool of claim 1, wherein the handle has a bulbous end opposite the substantially cuboid portion.

3. The lacrosse head removal and installation tool of claim 1, wherein the first end has a substantially planar surface.

4. The lacrosse head removal and installation tool of claim 1, wherein the second end has a substantially planar surface.

5. The lacrosse head removal and installation tool of claim 1, wherein the c-shaped channel conforms to a lacrosse stick.

6. The lacrosse head removal and installation tool of claim 1, wherein the substantially cuboid portion has rounded edges.

7. The lacrosse head removal and installation tool of claim 1, wherein the c-shaped channel is configured to conform to and receive a lacrosse stick shaft.

* * * * *